(12) United States Patent
Correia (10) Patent No.: US 10,570,760 B2
(45) Date of Patent: Feb. 25, 2020

(54) TURBINE NOZZLE WITH CMC AFT BAND

(71) Applicant: General Electric Company, Schenectady, NY (US)

(72) Inventor: Victor Hugo Silva Correia, Milton Mills, NH (US)

(73) Assignee: General Electric Company, Schenectady, NY (US)

(*) Notice: Subject to any disclaimer, the term of this patent is extended or adjusted under 35 U.S.C. 154(b) by 323 days.

(21) Appl. No.: 15/486,352

(22) Filed: Apr. 13, 2017

(65) Prior Publication Data

US 2018/0298768 A1 Oct. 18, 2018

(51) Int. Cl.
*F01D 9/04* (2006.01)
*F01D 11/00* (2006.01)

(52) U.S. Cl.
CPC ............ *F01D 9/041* (2013.01); *F01D 11/005* (2013.01); *F05D 2230/60* (2013.01); *F05D 2240/122* (2013.01); *F05D 2300/10* (2013.01); *F05D 2300/6033* (2013.01)

(58) Field of Classification Search
CPC .......... F01D 9/041; F01D 9/042; F01D 9/065; F01D 11/005; F05D 2240/122; F05D 2240/128
See application file for complete search history.

(56) References Cited

U.S. PATENT DOCUMENTS

| | | | |
|---|---|---|---|
| 3,807,891 A | 4/1974 | McDow et al. | |
| 4,309,145 A | 1/1982 | Viola | |
| 5,224,822 A * | 7/1993 | Lenahan | C23C 30/00 415/189 |
| 5,813,832 A * | 9/1998 | Rasch | F01D 5/005 415/191 |
| 6,164,903 A * | 12/2000 | Kouris | F01D 9/04 415/135 |
| 6,612,809 B2 * | 9/2003 | Czachor | F01D 11/005 415/189 |
| 6,742,987 B2 * | 6/2004 | Correia | F01D 9/042 415/189 |
| 6,824,359 B2 * | 11/2004 | Chlus | F01D 5/187 416/92 |
| 7,771,164 B2 * | 8/2010 | Manteiga | F01D 9/042 415/209.3 |
| 8,177,492 B2 | 5/2012 | Knapp et al. | |

(Continued)

*Primary Examiner* — Dwayne J White
*Assistant Examiner* — Jackson N Gillenwaters
(74) *Attorney, Agent, or Firm* — Dority & Manning, P.A.

(57) ABSTRACT

Flow path assemblies and methods for assembling such assemblies are provided. For example, a flow path assembly comprises a turbine nozzle segment including an airfoil extending axially between leading and trailing edges, an inner band defining a portion of a flow path inner boundary, and an outer band defining a portion of a flow path outer boundary. The airfoil includes a trailing edge portion defining the trailing edge and extending axially beyond the inner and outer bands such that the trailing edge is defined axially aft of the inner and outer band aft ends. The flow path assembly further comprises a shroud having a forward portion that extends axially along the trailing edge portion such that the forward portion defines the flow path outer boundary at the trailing edge portion. Methods of assembling flow path assemblies having a turbine nozzle assembly and inner and outer members also are provided.

19 Claims, 5 Drawing Sheets

(56) References Cited

U.S. PATENT DOCUMENTS

| | | | | |
|---|---|---|---|---|
| 8,206,096 B2* | 6/2012 | Prentice | ............... | F01D 5/282 |
| | | | | 415/191 |
| 8,303,245 B2* | 11/2012 | Foster | ............... | F01D 9/04 |
| | | | | 415/134 |
| 8,585,350 B1* | 11/2013 | Liang | ............... | F01D 5/189 |
| | | | | 415/115 |
| 8,690,527 B2 | 4/2014 | Matwey et al. | | |
| 9,062,560 B2* | 6/2015 | Hayford | ............... | F01D 17/162 |
| 9,932,847 B2* | 4/2018 | Boeck | ............... | F01D 9/041 |
| 2011/0217159 A1* | 9/2011 | McMahan | ............... | F02C 7/12 |
| | | | | 415/115 |
| 2015/0003973 A1 | 1/2015 | Lee et al. | | |
| 2016/0010482 A1 | 1/2016 | Rogers et al. | | |
| 2018/0298767 A1* | 10/2018 | Correia | ............... | F01D 9/041 |

* cited by examiner

TURBINE NOZZLE WITH CMC AFT BAND

FIELD

The present subject matter relates generally to gas turbine engines. More particularly, the present subject matter relates to turbine nozzles of gas turbine engines and, most particularly, to CMC aft band components for turbine nozzles.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More specifically, the combustion section includes a combustor having a combustion chamber defined by a combustor liner. Downstream of the combustor, the turbine section includes one or more stages, for example, each stage may contain a plurality of stationary nozzle airfoils arranged in a turbine nozzle assembly, as well as a plurality of blade airfoils attached to a rotor that is driven by the flow of combustion gases against the blade airfoils. The turbine section may have other configurations as well. In any event, a typical turbine nozzle assembly includes an inner boundary, generally referred to as an inner band, and an outer boundary, generally referred to as an outer band, and the plurality of nozzle airfoils extend from the inner band to the outer band.

The aft ends of typical turbine nozzle inner and outer bands, i.e., the portion of the inner and outer bands near a trailing edge of each nozzle airfoil, experience high temperatures that distress and degrade the durability of the bands. For instance, holes for a film of cooling air must be defined upstream of a throat between airfoils to minimize an aerodynamic efficiency loss. As a result, most of the cooling film dissipates before reaching the aft region of the bands such that the cooling film largely does not benefit the aft region of the inner and outer bands. As another example, a thermal barrier coating (TBC) applied to the inner and outer bands is prone to spallation, which reduces the effectiveness of the TBC, and the TBC typically has a limited effect in areas where cooling of the opposite surface is minimal, e.g., in the aft regions in the inner and outer turbine nozzle bands.

Accordingly, improved turbine nozzle aft band portions would be desirable. For example, a turbine nozzle assembly utilizing a high temperature material, such as a ceramic matrix composite (CMC) material, in the aft region of the turbine nozzle inner band and the aft region of the turbine nozzle outer band would be beneficial. As a particular example, a turbine nozzle system comprising a turbine nozzle segment with axially cropped inner and outer bands, a CMC inner member forming an aft portion of the inner band, and a CMC outer member forming an aft portion of the outer band, would be advantageous. Additionally, a turbine nozzle system having a CMC shroud comprising the CMC outer member would be useful.

BRIEF DESCRIPTION

Aspects and advantages of the invention will be set forth in part in the following description, or may be obvious from the description, or may be learned through practice of the invention.

In one exemplary embodiment of the present subject matter, a flow path assembly for a gas turbine engine is provided. The flow path assembly comprises a turbine nozzle segment that includes an airfoil extending axially between a leading edge and a trailing edge, an inner band defining a portion of an inner boundary of a flow path, and an outer band defining a portion of an outer boundary of the flow path. The airfoil includes a trailing edge portion defining the trailing edge, and the trailing edge portion of the airfoil extends axially beyond the inner band and the outer band such that the trailing edge is defined axially aft of an aft end of the inner band and an aft end of the outer band. The flow path assembly further comprises a shroud having a forward portion that extends axially along the trailing edge portion of the airfoil such that the forward portion of the shroud defines the outer boundary of the flow path at the trailing edge portion.

In another exemplary embodiment of the present subject matter, a method of assembling a flow path assembly for a gas turbine engine is provided. The flow path assembly defines a flow path and comprises a turbine nozzle assembly that includes an inner band defining a portion of an inner boundary of the flow path; an outer band defining a portion of an outer boundary of the flow path; and an airfoil having a trailing edge portion that extends axially beyond the inner band and the outer band. The trailing edge portion has an inner end radially opposite an outer end. The method comprises positioning an inner member aft of the inner band at the inner end of the trailing edge portion such that the inner member defines the inner boundary of the flow path along the trailing edge portion; and positioning an outer member aft of the outer band at the outer end of the trailing edge portion such that the outer member defines the outer boundary of the flow path along the trailing edge portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
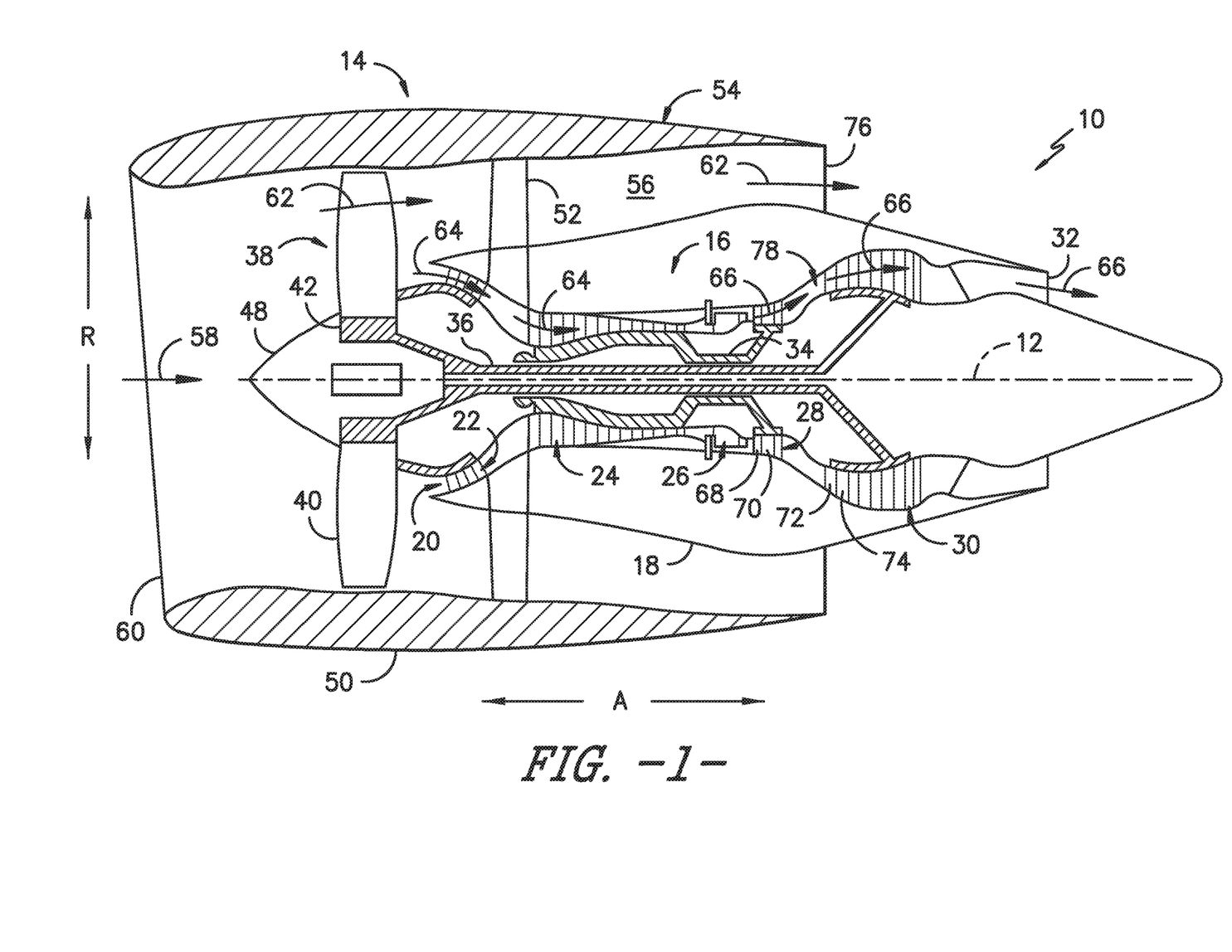
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
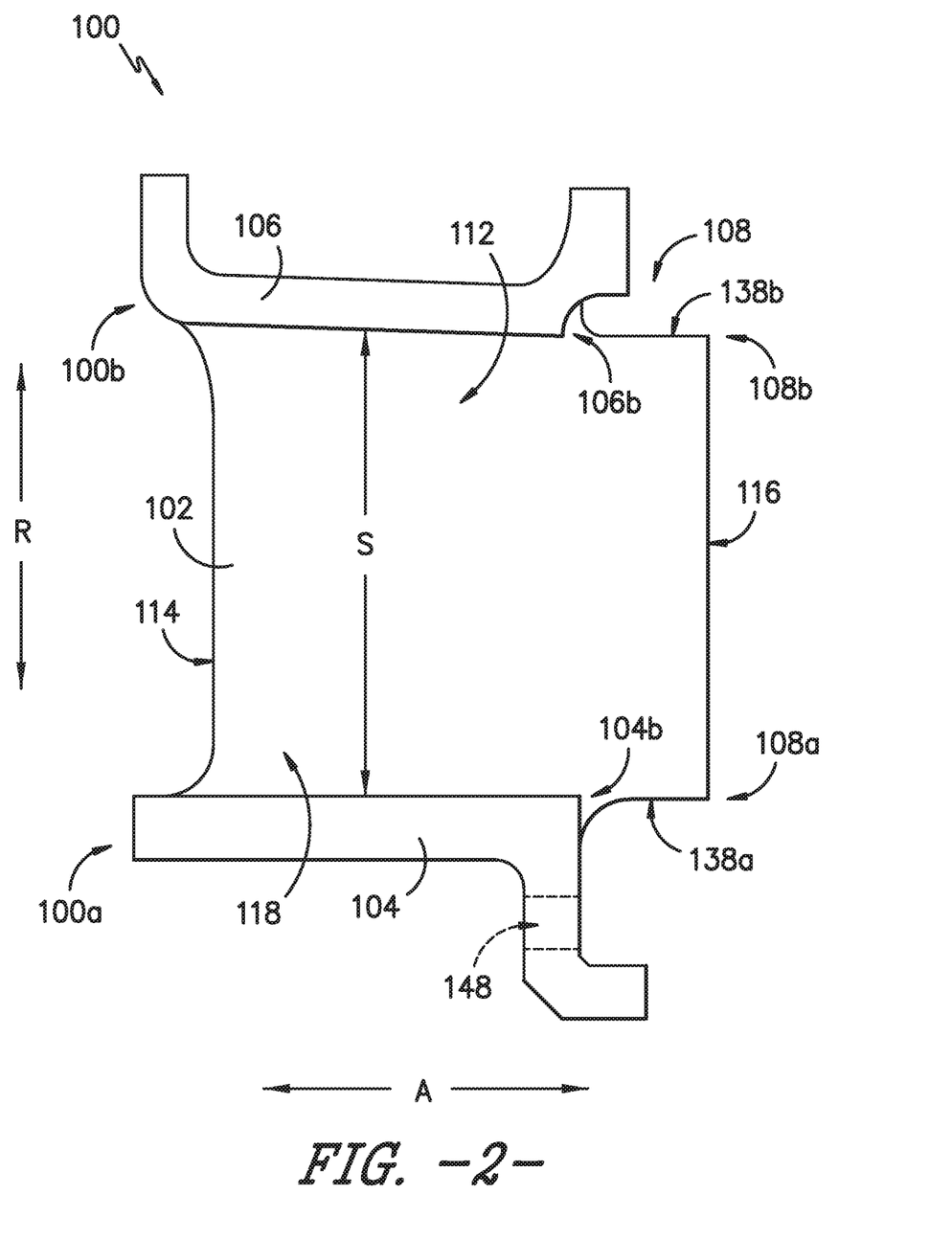
FIG. 2 provides a side view of a turbine nozzle segment according to an exemplary embodiment of the present subject matter.
Figure 3:
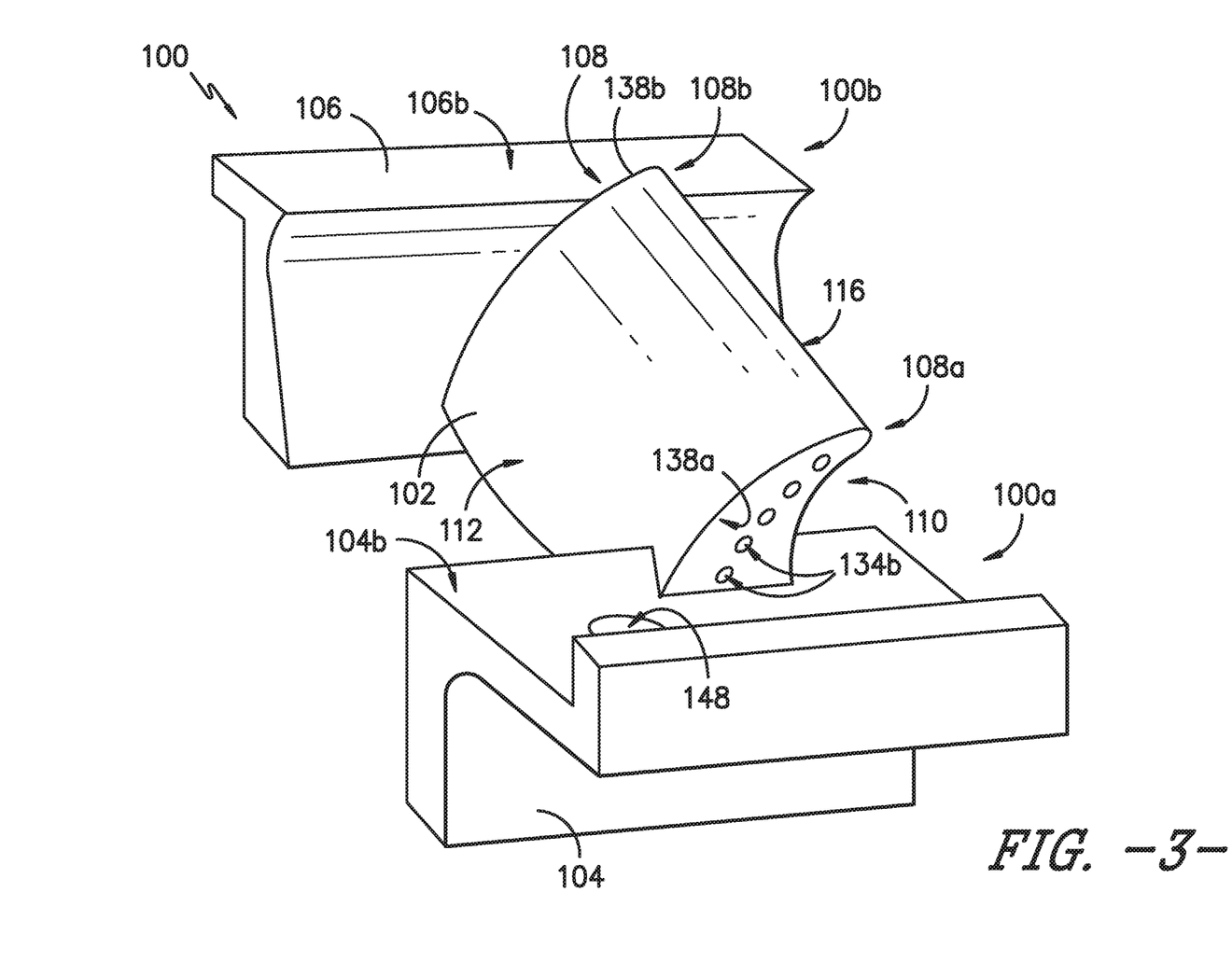
FIG. 3 provides an inner end perspective view of a portion of the turbine nozzle segment of FIG. 2.

FIGS. 2 and 3 illustrate a turbine nozzle segment according to an exemplary embodiment of the present subject matter. FIG. 2 provides a side view of exemplary turbine nozzle segment 100, and FIG. 3 provides an inner end perspective view of a portion of the turbine nozzle segment 100. As shown in the depicted embodiment, the turbine nozzle segment 100 comprises an airfoil 102, an inner band 104, and an outer band 106. The inner band 104 is defined at an inner end 100a of the turbine nozzle segment 100, and the outer band 106 is defined at an outer end 100b of the turbine nozzle segment 100. The inner band 104 defines a portion of an inner boundary of a flow path 101, which is defined in part by the turbine nozzle segment 100; the outer band 106 defines a portion of an outer boundary of the flow path 101. The airfoil 102 extends radially from the inner band 104 to the outer band 106, as well as extends axially between the inner and outer bands 104, 106. The airfoil 102 also includes a trailing edge portion 108 that extends axially beyond the inner and outer bands 104, 106. The trailing edge portion 108 has an inner end 108a radially opposite an outer end 108b. In some embodiments, a plurality of the turbine nozzle segments 100 together form an annular turbine nozzle assembly of the HP turbine 28 or the LP turbine 30, or the turbine nozzle assembly may be a single piece, annular structure having a plurality of airfoils 102 extending between an inner band 104 and an outer band 106 that each extend over 360° in the single piece structure. Thus, although described herein with respect to turbine nozzle segment 100, it will be understood that the present subject matter also is applicable to a single piece turbine nozzle assembly.

Further, the airfoil 102 of the turbine nozzle segment 100 has a concave pressure side 110 opposite a convex suction side 112. Opposite pressure and suction sides 110, 112 of the airfoil 102 radially extend between the inner band 104 and the outer band 106. Moreover, pressure and suction sides 110, 112 of the airfoil 102 axially extend between a leading edge 114 and an opposite trailing edge 116 and radially extend along an airfoil span S. Further, the pressure and suction sides 110, 112 define an outer surface 118 of the airfoil 102. It will be appreciated that the trailing edge portion 108 of airfoil 102 defines the trailing edge 116 of airfoil 102.

As illustrated in FIGS. 2 and 3, the inner band 104 and the outer band 106 of the turbine nozzle segment 100 do not extend along the trailing edge portion 108 of the airfoil 102. Rather, the trailing edge portion 108 of the airfoil 102 overhangs or extends beyond both the inner band 104 and the outer band 106. Stated differently, the inner and outer bands 104, 106 are axially truncated or cropped with respect to the airfoil 102 of the turbine nozzle segment 100. As such, the inner band 104 and the outer band 106 each end forward of the trailing edge 116, and the inner band 104 does not define the inner boundary of the flow path 101 at the trailing edge portion 108 and the outer band 106 does not define the outer boundary of the flow path 101 at the trailing edge portion 108.

Figure 4:
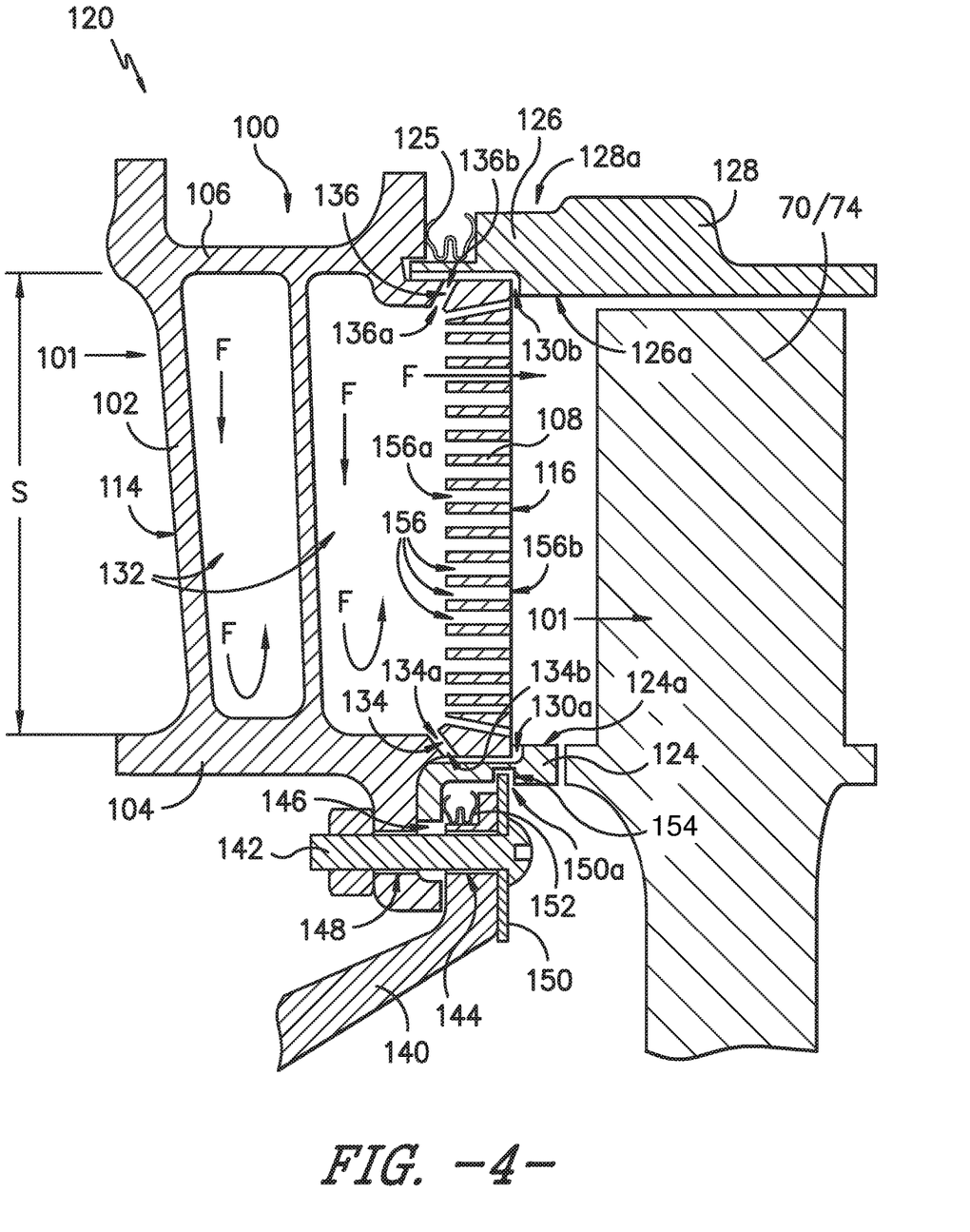
FIG. 4 provides a cross-section view of a turbine nozzle system according to an exemplary embodiment of the present subject matter.

FIG. 4 provides a cross-section view of a turbine nozzle system according to an exemplary embodiment of the present subject matter. As shown in FIG. 4, the exemplary turbine nozzle system 120 includes the turbine nozzle segment 100, an inner member 124, and an outer member 126. The inner member 124 is positioned aft of the inner band 104 at the inner end 108a of the trailing edge portion 108 of the turbine nozzle airfoil 102 such that the inner member 124 defines the inner boundary of the flow path 101 along the trailing edge portion 108. The outer member 126 is positioned aft of the outer band 106 at the outer end 108b of the trailing edge portion 108 of the turbine nozzle airfoil 102 such that the outer member 126 defines the outer boundary of the flow path 101 along the trailing edge portion 108. That is, the turbine nozzle system 120 defines a portion of the flow path 101. The inner band 104 defines a portion of the inner boundary and the inner member 124 defines the remainder of the inner boundary of the flow path 101 through the turbine nozzle system 120. Similarly, the outer band 106 defines a portion of the outer boundary and the outer member 126 defines the remainder of the outer boundary of the flow path 101 through the turbine nozzle system 120. Other structures positioned forward and/or aft of the turbine nozzle system 120 may define other portions of the inner and outer boundaries of the flow path 101 through the gas turbine engine 16.

In the depicted embodiment of FIG. 4, the outer member 126 is a portion of a shroud 128 positioned radially outward from a turbine blade 70 or 74. More particularly, as previously described, the HP turbine 28 and LP turbine 30 at least partially define the hot gas path 78 for routing the combustion gases 66 through the core turbine engine 16. Each turbine portion 28, 30 comprises stages of turbine rotor blades 70, 74 positioned within the flow of combustion gases 66, and the turbine rotor blades extract kinetic energy from the combustion gases 66 and thereby cause the HP shaft 34 and LP shaft 36 to rotate, supporting the operation of other components of the turbofan engine 10. The shroud 128, positioned radially outward from a stage of turbine rotor blades, at least partially defines an outer boundary of the hot gas path 78 through the stage of turbine rotor blades. Further, as shown in FIG. 4, the shroud 128 is positioned aft of the turbine nozzle segment 100 axially adjacent the outer band 106 of the turbine nozzle segment 100, and a forward portion 128a of the shroud 128 comprises the outer member 126. A seal 125, such as the W-seal 125 illustrated in FIG. 4, may be positioned between the shroud 128 and the outer band 106, or between the outer member 126 and the outer band 106 where the outer member 126 is formed separately from the shroud 128.

In some embodiments, the shroud 128 may be formed as a single piece, annular structure, i.e., a 360° shroud ring, and in other embodiments, the shroud 128 may be formed from two or more portions that together form an annular, 360° ring structure. Moreover, in some embodiments, the outer member 126 may be formed separately from the shroud 128 such that the shroud 128 does not comprise the outer member 126. In such embodiments, the outer member 126 may be formed as a single piece, annular structure, or the outer member 126 may be formed from two or more portions or segments that together form an annular, 360° ring structure. Similarly, the inner member 124 may be formed as a single piece, annular structure, or the inner member 124 may be formed from two or more portions or segments that together form an annular, 360° ring structure.

Figure 5A:
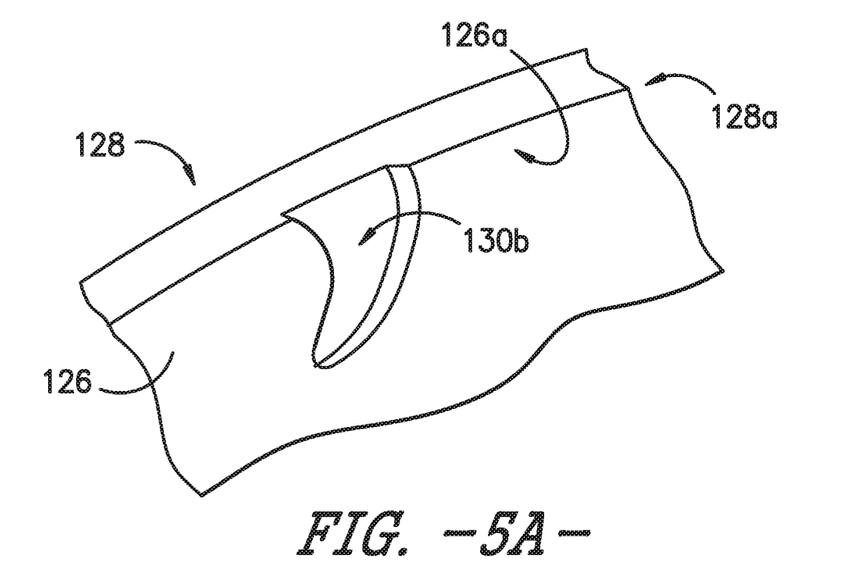
FIG. 5A provides a perspective view of a portion of a shroud of the turbine nozzle system of FIG. 4, where the shroud includes an outer member of the turbine nozzle system.
Figure 5B:
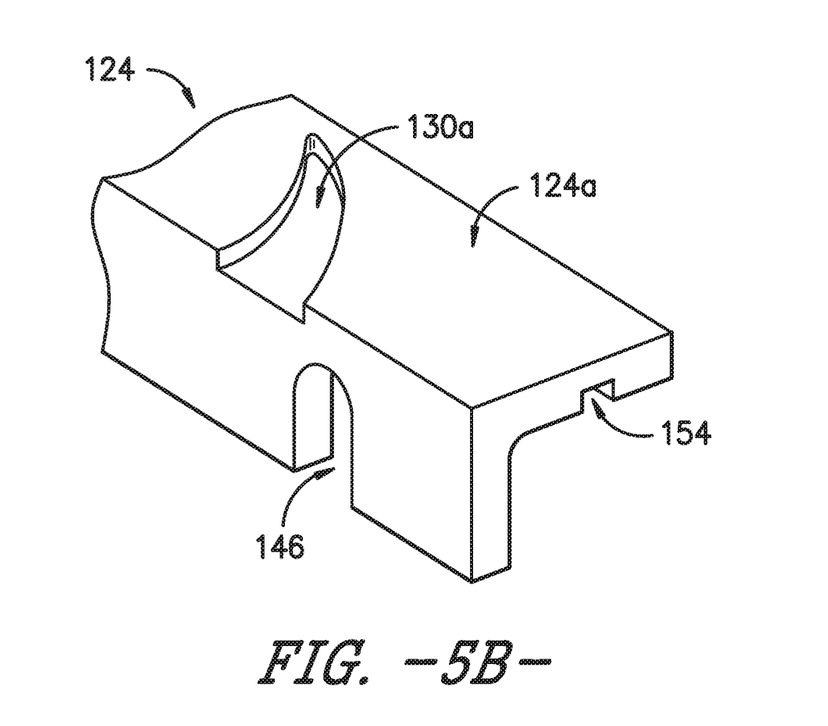
FIG. 5B provides a perspective view of a portion of an inner member of the turbine nozzle system of FIG. 4.

FIG. 5A provides a perspective view of a portion of the shroud 128, including the outer member 126, and FIG. 5B provides a perspective view of a portion of the inner member 124. As shown in FIGS. 4, 5A, and 5B, each of the inner member 124 and the outer member 126 defines a recess for receipt of an end of the trailing edge portion 108 of the turbine nozzle airfoil 102. Referring particularly to FIGS. 4 and 5B, the inner member 124 has a flow path surface 124a that defines a recess 130a for receipt of the inner end 108a of the trailing edge portion 108 of the airfoil 102. FIGS. 4 and 5A illustrate that the outer member 126 has a flow path surface 126a that defines a recess 130b for receipt of the outer end 108b of the trailing edge portion 108 of the airfoil 102. In other embodiments, one or both recesses 130a, 130b may be omitted, such that the trailing edge portion inner end 108a is substantially flush with the flow path surface 124a of the inner member 124 and/or the trailing edge portion outer end 108b is substantially flush with the flow path surface 126a of the outer member 126. In any event, it will be understood that the inner member 124 and the outer member 126, whether an individual component or part of the shroud 128, generally float with respect to the turbine nozzle airfoil 102. That is, unlike the inner band 104 and the outer band 106, neither the inner member 124 nor the outer member 126 are attached to the airfoil 102. As such, any stresses that would arise from attaching the inner and outer members 124, 126 to the airfoil 102 are eliminated.

As depicted in FIG. 4, the airfoil 102 of the turbine nozzle segment 100 may define one or more internal cavities 132 for receiving a flow of fluid F, e.g., a flow of pressurized air diverted from HP compressor 24. More particularly, a fluid flowing through the hot gas path 78, such as the combustion gases 66, may have a flow path pressure, and the flow of fluid F may be pressurized above the flow path pressure. Each internal cavity 132, in turn, may provide the flow of fluid F to one or more portions of airfoil 102, as well as to recesses 130a, 130b. For example, as shown in FIG. 4, the inner end 108a of the trailing edge portion 108 of the airfoil 102 defines at least one inner purge aperture 134 for purging the interface between the airfoil 102 and the inner member 124, e.g., for providing the flow of fluid F to the recess 130a into which the inner end 108a is received. Similarly, the outer end 108b of the trailing edge portion 108 of the airfoil 102 defines at least one outer purge aperture 136 for purging the interface between the airfoil 102 and the outer member 126, e.g., for providing the flow of fluid F to the recess 130b into which the outer end 108b is received. The flow of fluid F to the recesses 130a, 130b may help cool the interfaces between the airfoil 102 and the inner and outer members 124, 126, as well as discourage the hot combustion gases 66 from flowing into the recesses 130a, 130b. Moreover, the purge fluid flow from the internal cavities 132 to the recesses 130a, 130b may help discourage cross-over leakage from the pressure side 110 to the suction side 112 of the airfoil 102, i.e., purging the interfaces between the airfoil 102 and the inner and outer members 124, 126 may provide fluidic sealing against cross-airfoil bypass flow of the combustion gases 66.

As shown in FIG. 4, each inner purge aperture 134 extends between an inlet 134a at the internal cavity 132 and an outlet 134b defined at the inner end 108a of the trailing edge portion 108. Likewise, each outer purge aperture 136 extends between an inlet 136a at the internal cavity 132 and an outlet 136b defined at the outer end 108b of the trailing edge portion 108. More specifically, as shown in FIG. 3, the inner end 108a of the airfoil trailing edge portion 108 defines an interface surface 138a, and a plurality of inner purge aperture outlets 134b are defined along the interface surface 138a. It will be appreciated that a plurality of outer purge aperture outlets 136b may be similarly defined along an interface surface 138b of the outer end 108b of the airfoil trailing edge portion 108.

FIG. 4 also illustrates a support structure for the inner member 124. For instance, in the depicted embodiment, a nozzle support member 140 is positioned radially inward of the inner member 124. An attachment mechanism 142, such as a bolt or other suitable attachment mechanism, extends through the nozzle support member 140, the inner member 124, and the inner band 104 to secure the nozzle support member 140 and the inner member 124 with respect to the turbine nozzle segment 100. More particularly, the nozzle support member defines an aperture 144 therethrough for receipt of the attachment mechanism 142. As most clearly illustrated in FIG. 5B, the inner member 124 defines a first slot 146 therethrough for receipt of the attachment mechanism 142. In other embodiments, such as where the inner member 124 is formed from a plurality of segments rather than as a single piece, annular structure, the first slot 146 may be configured as an aperture rather than a slot. Further, as shown most distinctly in FIGS. 2 and 3, the inner band 104 of the turbine nozzle segment 100 defines an aperture 148 therethrough for receipt of the attachment mechanism 142. Accordingly, the attachment mechanism 142 may extend through the aperture 144, the first slot 146, and the aperture 148 to attach the nozzle support member 140, the inner member 124, and the inner band 104 to one another.

Additionally, the exemplary embodiment depicted in FIG. 4 includes a discourager seal 150. The discourager seal 150, for example, helps prevent hot gases, such as the hot combustion gases 66, from leaking into the space between the nozzle support member 140 and the inner member 124, e.g., where a W-seal 152 is positioned as shown in FIG. 4 and/or through the aperture 144 in the nozzle support member 140. Thus, the discourager seal 150 may provide a sealing benefit against hot gas leakage through an aft end of the turbine nozzle system 120. The discourager seal 150 may be, e.g., a single piece ring or a split ring or may have any other suitable configuration.

As shown in FIG. 4, the discourager seal 150 spans an aft interface between the nozzle support member 140 and the inner member 124. The inner member 124 defines a second slot 154 that receives an end 150a of the discourager seal 150. The second slot 154 is shown most clearly in FIG. 5B. Therefore, in the embodiment illustrated in FIGS. 4 and 5B, the inner member 124 defines a first slot 146 for receipt of the attachment mechanism 142 and a second slot 154 for receipt of the end 150a of the discourager seal 150. In other embodiments, the inner member 124, nozzle support member 140, and/or the turbine nozzle inner band 104 may define other features for receipt of one or more attachment members 142 and/or seals 150, 152.

Referring still to FIG. 4, the trailing edge portion 108 of the airfoil 102 also may define a plurality of ejector apertures 156, through which the flow of fluid F received in the internal cavity 132 may be ejected out of the airfoil 102. As shown in FIG. 4, the ejector apertures 156 may be radially spaced apart from one another along the trailing edge portion 108 and may be defined along substantially the entire span of the airfoil 102. It will be appreciated that each ejector aperture 156 includes an inlet 156a at the internal cavity 132 and an outlet 156b defined at or near the airfoil trailing edge 116. The flow of fluid F through the ejector apertures 156 may help cool the trailing edge portion 108 of the airfoil 102 and also may provide some cooling to downstream components in the flow path.

In some embodiments, the airfoil 102, the inner band 104, and the outer band 106 of the turbine nozzle segment 100 are a single piece, integral structure. In other embodiments, the airfoil 102, the inner band 104, and the outer band 106 may be formed separately and attached together by any suitable process to form the turbine nozzle 100. Further, each turbine nozzle segment 100 of a turbine nozzle assembly within the HP turbine 28 or the LP turbine 30 may comprise a single airfoil 102, i.e., the turbine nozzle segment 100 may be a singlet, or the turbine nozzle segment 100 may comprise two or more airfoils 102, e.g., the turbine nozzle segment 100 may be a doublet (comprising two airfoils 102), a triplet (comprising three airfoils 102), etc. As previously described, the turbine nozzle segments 100 of a stage of the HP turbine 28 or LP turbine 30 are positioned side by side to form an annular turbine nozzle structure that extends 360° about the axial centerline 12 (FIG. 1). Alternatively, the turbine nozzle assembly may be a single piece structure rather than formed from a plurality of turbine nozzle segments 100.

In embodiments such as the embodiment of FIG. 4, where a shroud 128 comprises the outer member 126, the turbine nozzle segment 100 and the shroud 128 may be referred to as a flow path assembly. More particularly, a turbine nozzle assembly, comprising a plurality of turbine nozzle segments 100, and the shroud 128 may form a portion of a flow path assembly through the gas turbine engine 16. The flow path assembly also may include the combustion section 26 and other portions of the HP turbine 28 and/or LP turbine 30. Thus, as shown in FIG. 4, the flow path assembly at least includes a turbine nozzle segment 100 that has an airfoil 102 extending axially between a leading edge 114 and a trailing edge 116 and including a trailing edge portion 108 that defines the trailing edge 116. The turbine nozzle segment 100 of the flow path assembly also includes an inner band 104 defining a portion of an inner boundary of a flow path 101, and an outer band 106 defining a portion of an outer boundary of the flow path 101. As depicted in FIG. 4, the trailing edge portion 108 of the airfoil 102 extends axially beyond the inner band 104 and the outer band 106 such that the trailing edge 116 is defined axially aft of an aft end 104b of the inner band 104 and an aft end 106b of the outer band 106. The flow path assembly also includes a shroud 128 having a forward portion 128a that extends axially along the trailing edge portion 108 of the airfoil 102 such that the forward portion 128a of the shroud 128 defines the outer boundary of the flow path 101 at the trailing edge portion 108.

As further shown in FIG. 4, the forward portion 128a of the shroud 128, which comprises outer member 126, defines a recess 130b for receipt of the outer end 108b of the trailing edge portion 108 of the airfoil 102. An inner member 124 is positioned at the inner end 108a of the turbine nozzle portion 108, and the inner member 124 defines a recess 130a for receipt of the inner end 108a of the trailing edge portion 108. Moreover, a portion of the shroud 128 that is aft of the forward portion 128a is positioned radially outward from a plurality of turbine rotor blades, such as turbine rotor blades 70 or 74 described above. The shroud 128, which may be formed as a single piece, generally annular structure or from a plurality of shroud segments that together form a generally annular structure, may be formed from a CMC material. Further, it will be appreciated that the turbine nozzle segment 100 and inner member 124 of the flow path assembly each may be configured as previously described.

Thus, a method of assembling the flow path assembly of a gas turbine engine, such as gas turbine engine 16, may be provided. The flow path assembly, as described above, defines a flow path 101 and comprises a turbine nozzle assembly that has an inner band 104 defining a portion of an inner boundary of the flow path 101; an outer band 106 defining a portion of an outer boundary of the flow path 101; and an airfoil 102 having a trailing edge portion 108 that extends axially beyond the inner band 104 and the outer band 106 and has an inner end 108a radially opposite an outer end 108b. The method of assembly may include positioning an inner member 124 aft of the inner band 104 at the inner end 108a of the trailing edge portion 108 of the airfoil 102 such that the inner member 124 defines the inner boundary of the flow path 101 along the trailing edge portion 108. The method also may include positioning an outer member 126 aft of the outer band 106 at the outer end 108b of the trailing edge portion 108 such that the outer member 126 defines the outer boundary of the flow path 101 along the trailing edge portion 108. In some embodiments, a forward portion 128a of a shroud 128 comprises the outer member 126, such that positioning the outer member 126 aft of the outer band 106 comprises positioning the shroud 128 aft of the turbine nozzle assembly. Moreover, positioning the inner member 124 aft of the inner band 104 may comprise positioning the inner end 108a of the trailing edge portion 108 within a recess 130a defined in the inner member 124, and positioning the outer member 126 aft of the outer band 106 may comprise positioning the outer end 108b of the trailing edge portion 108 within a recess 130b defined in the outer member 126.

The method also may comprise positioning a nozzle support member 140 radially inward of the inner member 124 and inserting an attachment mechanism 142 through the nozzle support member 140, the inner member 124, and the inner band 104 to secure the nozzle support member 140 and the inner member 140 with respect to the turbine nozzle assembly. Further, the method may comprise inserting a discourager seal 150 such that the discourager seal 150 spans an interface between the nozzle support member 140 and the inner member 124. Additionally, the method may include installing the flow path assembly in the gas turbine engine.

In exemplary embodiments, the turbine nozzle segment 100 is formed from a metallic material, such as a metal or metal alloy, and the inner member 124 and the outer member 126 are each formed from a ceramic matrix composite (CMC) material, which is a non-metallic material having high temperature capability. It may be particularly useful to utilize CMC materials for components within the hot gas path 78, but other components of turbofan engine 10, such as components of HP compressor 24, also may comprise a CMC material. Further, in other embodiments, the inner member 124 and outer member 126 may be formed from other suitable materials, such as other composite materials, monolithic ceramic materials, metallic materials, or the like.

Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a CMC inner member 124 and a CMC outer member 126. Further, it will be appreciated that, where a shroud 128 includes the outer member 126, the shroud 128 may be formed from a CMC material. Moreover, although described with respect to the exemplary embodiment as replacing both the aft portion of the inner band 104 and the aft portion of the outer band 106 with a separate component, i.e., inner member 124 and outer member 126, it will be understood that, in other embodiments, only one or the other of the aft portions may be replaced with a separate component. That is, in some embodiments, the inner band 104 may axially extend to or beyond the trailing edge 116 of the airfoil 102 such that the inner member 124 is omitted. In other embodiments, the outer band 106 may axially extend to or beyond the airfoil trailing edge 116 such that the outer member 126 is omitted.

By utilizing a CMC inner member 124 and/or a CMC outer member 126, which form the aft portions of the turbine nozzle inner band and outer band, respectively, the effects of high temperatures at the aft end of turbine nozzle segments 100 may be reduced or eliminated. More particularly, typical turbine nozzle inner and outer bands that are formed from a metallic material, such as a metal or metal alloy, experience distress at the aft end of the nozzle (i.e., adjacent the trailing edge portion of the turbine nozzle airfoil) due to high temperatures, which may negatively affect part life and/or engine performance. Replacing the aft portions of the inner and/or outer bands 104, 106 with CMC components, which can withstand higher temperatures than metallic components, reduces the distress on the aft portions of the bands. Further, as described herein with respect to the exemplary embodiment, the CMC inner member 124 and the CMC outer member 126 may "float" with respect to the turbine nozzle airfoil 102 to reduce the stresses on the CMC members 124, 126. Additionally, purge flow from within the airfoil 102 to the inner and outer ends 108a, 108b of the trailing edge portion 108 of the airfoil 102 may provide cooling to the interface between the airfoil 102 and the CMC members 124, 126, as well as help prevent cross-over leakage at the interface. Of course, other advantages and benefits also may be realized from replacing the aft ends of the turbine nozzle inner and outer bands 104, 106 with CMC inner and outer band members 124, 126. Additionally, as described above, the inner and outer members 124, 126 also may be formed from other high temperature materials or from any other suitable material.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A flow path assembly for a gas turbine engine, comprising:
    a turbine nozzle segment including
        an airfoil extending between a leading edge and a trailing edge along an axial direction of the gas turbine engine, the airfoil including a trailing edge portion defining the trailing edge,
        an inner band defining a portion of an inner boundary of a flow path, and
        an outer band defining a portion of an outer boundary of the flow path,
        wherein the trailing edge portion of the airfoil extends along the axial direction beyond the inner band and the outer band such that the trailing edge is defined aft of an aft end of the inner band and an aft end of the outer band; and
    a shroud having a forward portion that extends along the axial direction along the trailing edge portion of the airfoil such that the forward portion of the shroud defines the outer boundary of the flow path at the trailing edge portion,
    wherein the forward portion of the shroud defines a recess for receipt of the outer end of the trailing edge portion of the airfoil.

2. The flow path assembly of claim 1, wherein a portion of the shroud aft of the forward portion is positioned outward along a radial direction of the gas turbine engine from a plurality of turbine blades.

3. The flow path assembly of claim 1, wherein the shroud is formed from a ceramic matrix composite material.

4. The flow path assembly of claim 3, wherein the airfoil, the outer band, and the inner band of the turbine nozzle segment are integrally formed as a single piece from a metallic material.

5. The flow path assembly of claim 1, wherein the outer end of the trailing edge portion of the airfoil defines at least one outer purge aperture for purging an interface between the trailing edge portion of the airfoil and the forward portion of the shroud.

6. The flow path assembly of claim 5, wherein the airfoil defines an internal cavity for providing a flow of fluid to the at least one outer purge aperture.

7. The flow path assembly of claim 1, further comprising a plurality of turbine nozzle segments, the plurality of turbine nozzle segments together forming a generally annular turbine nozzle assembly.

8. The flow path assembly of claim 1, wherein the shroud comprises a plurality of shroud segments.

9. A method of assembling a flow path assembly for a gas turbine engine, the flow path assembly defining a flow path, the flow path assembly comprising a turbine nozzle assembly including:
    an inner band defining a portion of an inner boundary of the flow path;
    an outer band defining a portion of an outer boundary of the flow path; and
    an airfoil having a trailing edge portion that extends along an axial direction of the gad turbine engine beyond the inner band and the outer band, the trailing edge portion having an inner end opposite an outer end along a radial direction of the gas turbine engine,
    the method comprising:
    positioning an inner member aft of the inner band at the inner end of the trailing edge portion such that the inner member defines the inner boundary of the flow path along the trailing edge portion; and
    positioning an outer member aft of the outer band at the outer end of the trailing edge portion such that the outer member defines the outer boundary of the flow path along the trailing edge portion,
    wherein the inner end of the trailing edge portion of the airfoil defines at least one inner purge aperture for purging an interface between the trailing edge portion of the airfoil and the inner member.

10. The method of claim 9, wherein a forward portion of a shroud comprises the outer member.

11. The method of claim 9, wherein the outer end of the trailing edge portion of the airfoil defines at least one outer purge aperture for purging an interface between the trailing edge portion of the airfoil and the outer member.

12. The method of claim 9, wherein the outer member and the inner member are formed from a ceramic matrix composite material.

13. The method of claim 10, wherein the turbine nozzle assembly is formed from a metallic material.

14. The method of claim 13, wherein the turbine nozzle assembly comprises a plurality of turbine nozzle segments, each turbine nozzle segment comprising an airfoil, a portion of the outer band, and a portion of the inner band that are integrally formed as a single piece.

15. The method of claim 9, further comprising:
    positioning a nozzle support member inward of the inner member along a radial direction of the gas turbine engine; and
    inserting an attachment mechanism through the nozzle support member, the inner member, and the inner band to secure the nozzle support member and the inner member with respect to the turbine nozzle assembly.

16. The method of claim 15, further comprising:
    inserting a discourager seal such that the discourager seal spans an interface between the nozzle support member and the inner member.

17. The method of claim 9, wherein positioning the inner member aft of the inner band comprises positioning the inner end of the trailing edge portion within a recess defined in the inner member, and wherein positioning the outer member aft of the outer band comprises positioning the outer end of the trailing edge portion within a recess defined in the outer member.

18. The method of claim 9, wherein the flow path assembly is installed in the gas turbine engine.

19. A flow path assembly for a gas turbine engine, comprising:
- a turbine nozzle segment including
- an airfoil extending along an axial direction of the gas turbine engine between a leading edge and a trailing edge, the airfoil including a trailing edge portion defining the trailing edge,
- an inner band defining a portion of an inner boundary of a flow path, and
- an outer band defining a portion of an outer boundary of the flow path,
- wherein the trailing edge portion of the airfoil extends along the axial direction beyond the inner band and the outer band such that the trailing edge is defined aft of an aft end of the inner band and an aft end of the outer band; and
- a shroud having a forward portion that extends along the axial direction along the trailing edge portion of the airfoil such that the forward portion of the shroud defines the outer boundary of the flow path at the trailing edge portion,
- wherein the outer end of the trailing edge portion of the airfoil defines at least one outer purge aperture for purging an interface between the trailing edge portion of the airfoil and the forward portion of the shroud.

* * * * *